Nov. 10, 1936.   J. BURTON   2,060,171
SCAFFOLDING COUPLING
Filed June 4, 1935
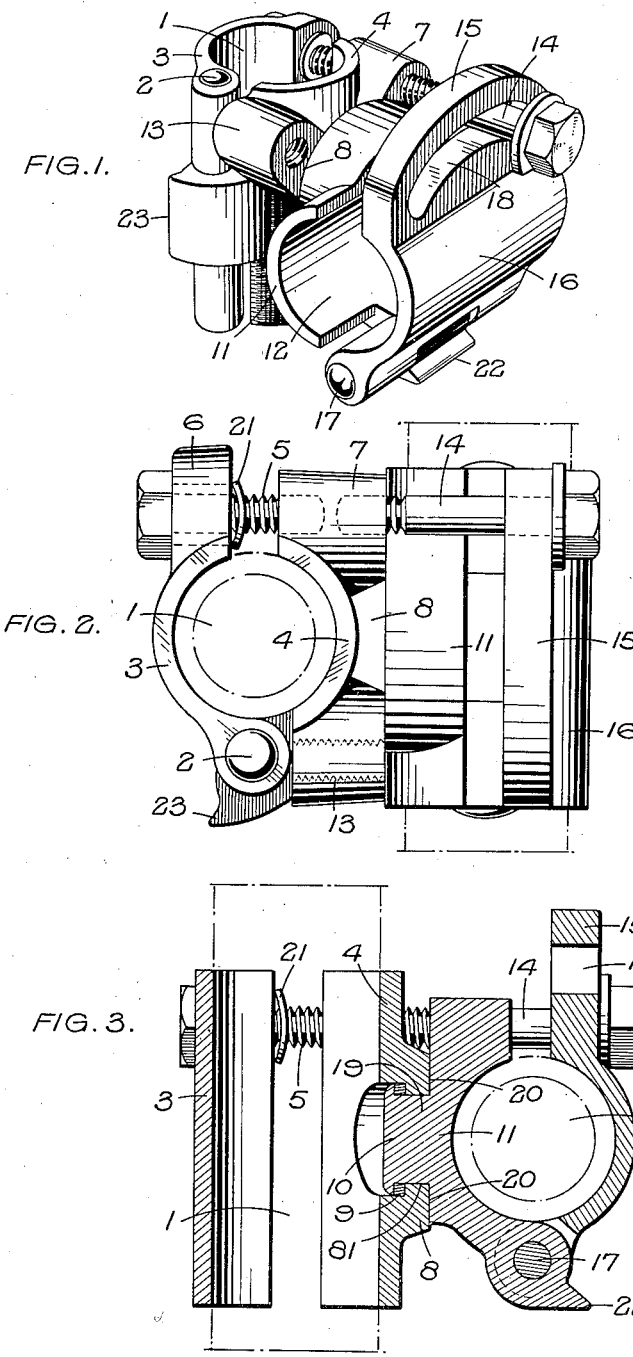
INVENTOR:
JOHN BURTON
BY: Ruege & Boyce
ATTORNEYS Patented Nov. 10, 1936

2,060,171

UNITED STATES PATENT OFFICE 2,060,171

SCAFFOLDING COUPLING

John Burton, Edgbaston, Birmingham, England

Application June 4, 1935, Serial No. 24,885
In Great Britain June 14, 1934

4 Claims. (Cl. 189—36)

This invention relates to scaffolding couplings of the kind used for connecting together two scaffolding members which are either parallel or disposed at any angle to one another. Couplings of this type are commonly employed for connecting ledgers to standards or putlogs, or connecting inclined bracing members to standards or ledgers.

The present invention refers particularly to that kind of coupling which comprises a pair of clamp parts pivotally connected together so as to be capable of angular adjustment in parallel planes, each of which parts carries a hinged cap and has a clamping device (such as a screw or bolt) associated therewith whereby a scaffolding member may be gripped between said cap and said clamp part, the coupling also including means for locking the clamp parts in the adjusted position.

One object of the present invention is to simplify the construction of such couplings and a further object is to provide a more secure lock against angular displacement of the clamp parts.

Referring to the drawing:—

Figure 1 is a perspective view showing one embodiment of the invention.

Figure 2 is a plan view.

Figure 3 is a sectional view in side elevation.

In the construction illustrated, the coupling comprises a pair of clamps 1, 12 which are pivoted together, each clamp comprising a semi-cylindrical inner part and a cap of similar form hinged to one edge of the latter, so that it can be brought face to face therewith for the purpose of gripping a scaffolding member. The clamp 1 may be placed with its axis substantially vertical, the hinge 2 connecting the cap 3 to the inner part 4 being, of course, parallel to the axis of the cylinder formed by these members when the clamp is closed.

The cap 3 can be drawn towards the part 4 of the clamp, when it is desired to grip a scaffolding member, by means of a screw 5 passing through a lug 6 on the cap 3 and engaging in a socket 7 on the part 4.

The other clamp 12 is similarly arranged and includes an inner part 11, with a cap 16 hinged thereto at 17, and a clamping screw 14.

The inner part 4 of the clamp 1 is provided at about the centre of its inner jaw with a boss 8 having a central hole 81 extending therethrough. This hole receives a shank 19 on the inner part 11 of the adjacent clamp 12 and is countersunk at 9 to accommodate a head 10 formed on said shank after assembly of the parts, the two clamps being thus pivotally connected together.

The head 10 upon the part 4 does not project into the interior of the clamp 1 in such a manner as to foul or engage the tube or scaffolding member which is placed therein. This avoids subjecting the pivot pin and its seat to additional stress.

The part 4 is further provided with a second boss or socket 13 which is spaced from the socket 7. Both these bosses or sockets are provided with screw threaded holes at their outer ends so that they form alternative anchorages for the clamping screw 14 used with the clamp 12.

At the free edge of the cap 16 associated with the latter a flange 15 is formed in which there is an arcuate slot 18, this slot being concentric with the pivotal centre of the shank 19 about which the two clamps can turn. The screw 14 extends through this slot 18, and engages with the threaded hole in either of the two bosses or sockets 7, 13 as aforesaid.

Tightening this screw 14 has the effect of fastening the clamp 12 on to its scaffolding member, and also forcing the two clamps into binding engagement, this engagement taking place between a flat surface 20 on the part 11 of the clamp 12 and the end of the boss 8 provided on the part 4 of the clamp 1.

The slot 18 is of a length which will permit the clamp 12 to turn about the centre of the shank 19 through 90° relatively to the clamp 1, the motion being limited by the screw 14. The screw 14, however, can be moved from the position shown in Figure 1 to a position in which its end engages the socket 13, so that a further 90° of movement of the clamp 12 can thus be obtained.

Either or both of the clamping screws may be provided with a washer such as 21 adapted to prevent the complete withdrawal of the screw from the cap with which it is associated.

Further, the part 11 may be provided with a horn 22 and a similar horn 23 may be formed on the part 4, these horns respectively supporting the caps 16 and 3 when the latter are moved to the open position.

What I claim then is:—

1. A scaffolding coupling comprising a pair of clamp parts, a cap hinged to each of said clamp parts, a separate clamping device associated with each cap whereby a scaffolding member may be gripped between said cap and the clamp part hinged thereto, and means pivotally connecting said clamp parts independently of said clamping devices and permitting relative angular movement of said clamp parts in parallel planes, one of said clamping devices directly engaging the clamp part hinged to the other of said caps so that the act of gripping a scaffolding member thereby also causes the coacting faces of said clamp parts to be forced tightly together.

2. A scaffolding coupling comprising a pair of clamp parts pivotally connected together so as to be capable of angular movement in parallel planes, a cap hinged to each of said clamp parts, and a clamping device associated with said cap whereby a scaffolding member may be gripped between said cap and said clamp part, one of said clamping devices being connected to the other clamp part so that the act of gripping a scaffolding member thereby also causes the coacting faces of said clamp parts to be forced tightly together, said last-mentioned clamping device extending through an arcuate slot formed in the clamp part associated therewith and disposed concentric with the pivotal axis of said clamp parts, the length of said slot being sufficient to allow adjustment of said clamp parts through 90° of relative angular movement.

3. A scaffolding coupling comprising a pair of clamp parts pivotally connected together so as to be capable of angular movement in parallel planes, a cap hinged to each of said clamp parts, and a clamping device associated with said cap whereby a scaffolding member may be gripped between said cap and said clamp part, one of said clamping devices being connected to the other clamp part so that the act of gripping a scaffolding member thereby also causes the coacting faces of said clamp parts to be forced tightly together, said other clamp part being formed with two sockets or openings for selective engagement by said last-mentioned clamping device, said sockets or openings being spaced angularly at 90° apart with reference to the pivotal axis of said clamp parts, so as to provide two alternative positions of said clamp parts relatively one to the other.

4. A scaffolding coupling comprising a pair of clamp parts pivotally connected together so as to be capable of angular movement in parallel planes, a cap hinged to each of said clamp parts, and a clamping device associated with said cap whereby a scaffolding member may be gripped between said cap and said clamp part, one of said clamping devices being connected to the other clamp part so that the act of gripping a scaffolding member thereby also causes the coacting faces of said clamp parts to be forced tightly together, said last-mentioned clamping device extending through an arcuate slot formed in the clamp part associated therewith and disposed concentric with the pivotal axis of said clamp parts, the length of said slot being sufficient to allow adjustment of said clamp parts through 90° of relative angular movement, said other clamp part being formed with two sockets or openings for selective engagement by said last-mentioned clamping device, said sockets or openings being spaced angularly at 90° apart with reference to the pivotal axis of said clamp parts, so that movement of said last-mentioned clamping device from one of said sockets or openings to the other, in conjunction with the adjustment afforded by said arcuate slot, provides for a full 180° of relative angular movement between said clamp parts.

JOHN BURTON.